Fig. 1.

Jan. 1, 1963 R. E. BLAU ET AL 3,071,225
POWER TRANSMISSION COUPLING
Filed May 20, 1960 6 Sheets-Sheet 2

United States Patent Office 3,071,225
Patented Jan. 1, 1963

3,071,225
POWER TRANSMISSION COUPLING
Robert E. Blau, Winnetka, Ill., and Ralph A. Evans, Beech Grove, and Louis J. Stephanoff, Indianapolis, Ind., assignors to Link-Belt Company, a corporation of Illinois
Filed May 20, 1960, Ser. No. 30,620
20 Claims. (Cl. 192—58)

This invention relates to power transmission couplings, and deals more particularly with couplings wherein torque and power are transmitted between two rotatable members by means of shear strain developed in a viscous fluid subjected to the relative movement of two opposed surfaces between which the fluid is located.

A primary object of this inventon is to provide a power transmission coupling which permits slippage between the driving and driven members and wherein the transmitted torque is limited to a predetermined maximum amount.

Another object of this invention is to provide a coupling of the viscous fluid shear type having a more desirable characteristic of torque versus slip over the full, 0% to 100%, slip range than obtained by previously proposed couplings of this type.

A more specific object of this invention is to provide a viscous fluid shear coupling having a relatively small amount of slip at rated torque and a relatively uniform output torque, somewhat higher than rated torque, for higher values of slip, the small slip at rated torque giving the coupling under normal operating conditions a high mechanical efficiency and minimizing the generation of heat, and the uniform output torque at the higher values of slip serving to prevent the transmission of overloads and shocks through the coupling, thereby preventing damage from these effects to both the driving and driven members.

Another object of this invention is to provide a torque limiting, viscous fluid shear coupling wherein the transmitted torque is utilized, at loads above a given value, to increase the spacing between the opposed shear surfaces as the load increases, and to decrease the spacing between such surfaces as the load decreases, thereby regulating the development of shear strain in the viscous fluid in such a manner as to limit the torque transmitting capacity of the coupling and provide a relatively constant output torque for loads greater than the given value.

A further object of this invention is to provide a power transmission coupling of the foregoing type in which the maximum output torque characteristic of the coupling is variable over a wide range of values by means of a simple adjustment.

Another object of this invention is to provide a coupling of the above character capable of transmitting torque between two rotatable members regardless of the direction in which the driving member is rotated.

A further object of this invention is the provision of a coupling in which the transmitted torque is dependent on the axial position of a rotatable intermediate member, with means for automatically effecting axial movement of such member in response to changes in the amount of torque transmitted by the coupling.

Other objects and advantages of the invention will be apparent during the course of the following description.

In the accompanying drawings forming a part of this specification and in which like reference numerals are employed to designate like parts throughout the same.

Figure 1:
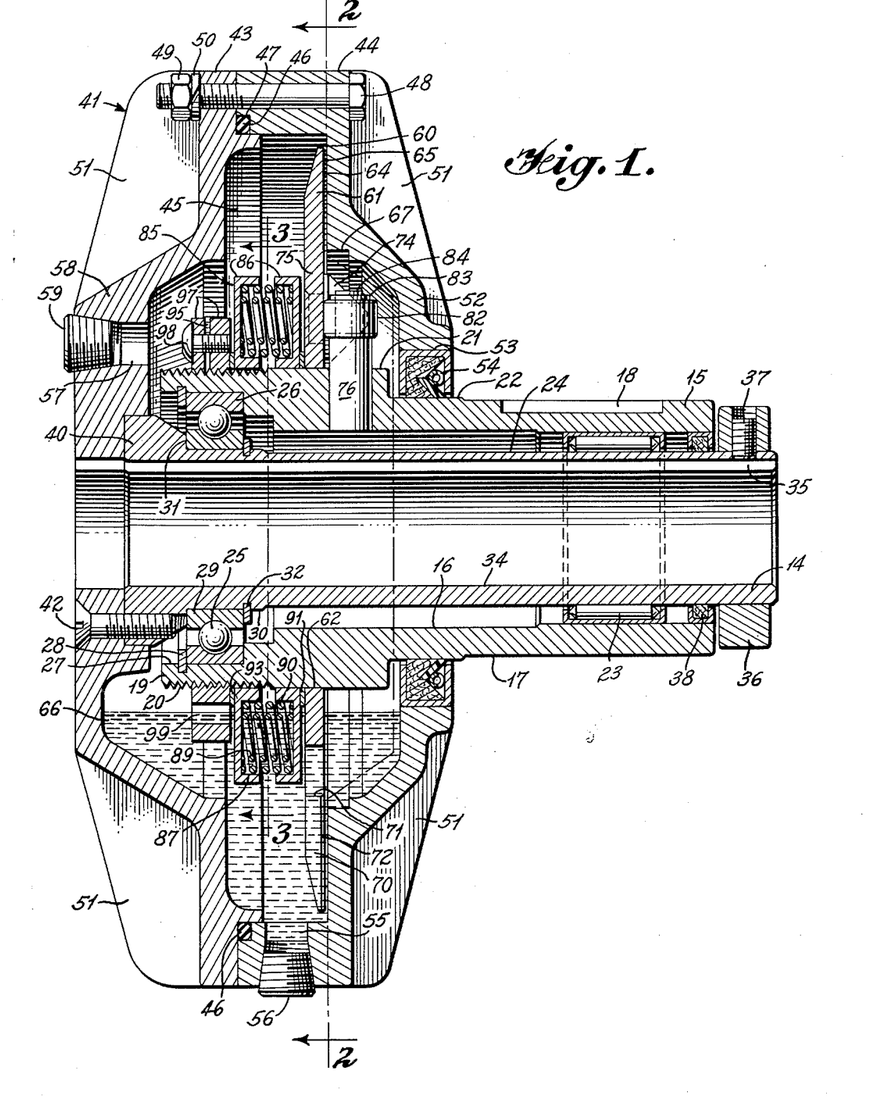
FIGURE 1 is a sectional view of a coupling embodying the present invention, the section being taken on the longitudinal axis of the coupling.

In the drawings, wherein for the purpose of illustration are shown the preferred embodiments of this invention, and first particularly referring to the modification of FIGS. 1 to 6, inclusive, the coupling shown best in FIG. 1, comprises driving and driven members in the form of two coaxial shafts 14 and 15, respectively. The driven member 15 is the outermost of the two shafts and has a bore 16 for receiving the driving shaft 14. At its right-hand end, the driven shaft 15 has a cylindrical peripheral surface 17 provided with a keyway 18 to permit the attachment of a pulley, a sprocket or any other conventional means for taking power therefrom. At its left-hand end, the driven shaft 15 has an enlarged portion 19 which is provided on its external surface with a screw thread 20, which extends some distance inwardly from the end thereof, and a smooth cylindrical surface 21 for the remainder of the enlarged portion. Between the cylindrical surfaces 17 and 21 there is provided a cylindrical surface 22 of a relatively short axial length having a diameter between those of the surfaces 17 and 21.

The driving shaft 14 is mounted in the bore 16 of the shaft 15 by means of a roller bearing 23 located near the right-hand ends of the shafts. Also, near the other ends of the two shafts is a single row, deep groove ball bearing 25 having an outer race 26, located in a counterbore 27 formed in the end of the shaft 15 and held in place by a retaining ring 28, and an inner race 29 fitted on a slightly enlarged, peripheral surface 30 on the driving shaft 14, and held in place against a shoulder 31 by a retaining ring 32.

In order to permit the driving shaft 14 to be connected to a source of power, it is provided with a bore 34 and a keyway 35 to receive and be connected to the shaft of an electric motor, or other power source. At its right-hand end, the driving shaft 14 is provided with a conventional locking collar 36 having a set screw 37 for securely fixing the driving shaft to the power source. Also, at the right-hand end of the shaft 14 is a seal 38 for closing the space between the bore 16 and the outer surface of the shaft 14.

At its left-hand end the driving shaft 14 has a radially enlarged head 40 to which is connected a housing 41, as by bolts 42, so that the housing will rotate with, or be driven by, the shaft 14. The housing 41 consists of two sections 43 and 44 which together define a generally annular chamber 45 surrounding the left-hand portions of the concentric shafts 14 and 15. The two housing sections 43 and 44 have peripheral wall portions which are provided with a telescopic or overlapping fit that is sealed by the O-ring 46 seated in the groove 47 formed in the housing section 44. The two sections are held together at their peripheral portions by a plurality of bolts 48 and nuts 49, see FIGS. 1 and 2. Lock washers 50 are used with these fasteners in accordance with standard practice. Each of the housing sections 43 and 44 is formed with a plurality of integral, radially extending cooling fins 51 to aid in the dissipation of heat from the coupling.

Referring to FIG. 1, it will be noted that the side wall 52 of the housing section 44 is formed with a central opening 53 surrounding the concentric shafts 14 and 15. The opening 53 is substantially larger than the diameter of the driven shaft 15 and is provided with an appropriate seal 54 having wiping engagement with the shaft surface 22. It will be noted that the seals 38, 46 and 54 prevent the escape of fluid from the housing chamber 45 or the entry of foreign material thereto. The housing 41 also is provided with two openings into the chamber 45. One is the opening 55 which is formed in the peripheral portion of the housing section 44 and is normally closed by a threaded plug 56. The other is the opening 57 which is formed in the side wall 58 of the housing section 43 and is normally closed by a threaded plug 59. The purpose of these openings will be explained later in the course of this description.

At this point it also should be noted that the housing section 44 is machined to provided a radially extending, annular viscous fluid shear surface 60 in the chamber 45 along the outer portion of the side wall 52 and concentric with the axes of the shafts 14 and 15. As will be explained later, this surface 60 is one of the opposed shear surfaces employed to subject a viscous fluid to shear strain for the purpose of effecting a transmission of torque.

Figures 2, 5, 6:
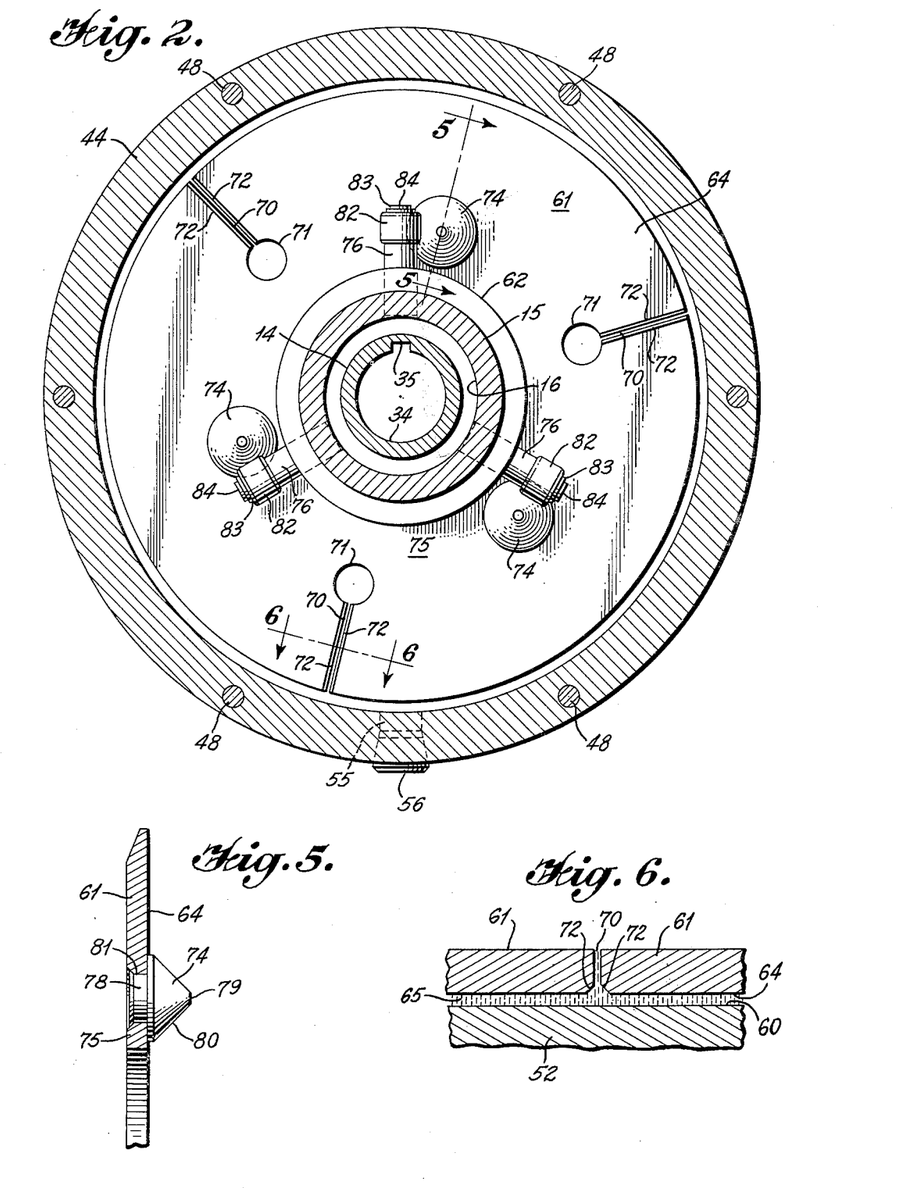
FIGURE 2 is a transverse sectional view taken on the line 2—2 of FIG. 1.
FIGURE 5 is a fragmentary sectional view taken on line 5—5 of FIG. 2.
FIGURE 6 is a fragmentary sectional view taken on line 6—6 of FIG. 2.

In order to provide for the transmission of torque between the housing 41, which is rotated by the driving shaft 14, and the driven shaft 15, the latter shaft has mounted thereon an intermediate member in the form of an annular disc 61. This disc is located in the chamber 45 and has a circular central opening 62 of a diameter slightly larger than the cylindrical surface 21 of the shaft 15 on which the disc is movably mounted. That is, the disc 61 is so fitted on the surface 21 as to be capable of both axial and angular movements with respect to the driven shaft 15 within the limits determined by other parts of the coupling assembly. As best seen in FIG. 1, the location of the disc 61 on the cylindrical surface 21 is such that the outer radial portion of the right-hand face of the disc is machined to provide a second radially extending, annular viscous fluid shear surface 64 positioned in close axially spaced opposing relationship to the housing shear surface 60 and concentric with the common axis of the shafts 14 and 15.

The close axial spacing of the opposed shear surfaces 60 and 64 defines between them a thin annular gap 65 which, during operation of the coupling, is filled with a film of torque transmitting fluid which is subjected to shear strain by the relative movement of the surfaces 60 and 64. This shear strain causes the transmission of torque between these surfaces and consequently between the housing 41 and the disc 61. To provide for this film in the gap 65, the chamber 45 is supplied with a quantity of torque transmitting fluid 66 which may be introduced into the chamber through, and up to the level of, the opening 57 when the plug 59 is removed and the housing is rotated 180° from the position illustrated in FIG. 1. By removing the plug 56, the opening 55 may be used to drain the fluid from the chamber 45 when the housing is in the position illustrated in FIG. 1. Preferably, the fluid 66 should be one having a relatively high viscosity and capable of a relatively small change in viscosity with changes in temperature, such as the widely used silicone fluids or others well known to the art.

In FIG. 1, the coupling is shown in a stationary position with the fluid 66 settled in the lower part of the chamber 45. It is obvious, however, that when the housing 41 is rotated by the driving shaft 14, the fluid will be thrown by centrifugal force to the peripheral portion of the chamber and will form an annular ring of fluid therein. The radial depth of this ring, of course, will depend on the quantity of fluid existing in the chamber 45 and should at least be sufficient to extend inwardly from the outer periphery of the chamber 45 to the cylindrical housing surface 67, thereby assuring that the gap 65 will be completely filled with a fluid film along its full radial extent.

In order to establish and maintain a fluid film in the gap 65, the disc 61, as best seen in FIGS. 2 and 6, has three radial slots 70 formed therein which extend inwardly from the circumference of the disc to the enlarged circular openings 71 formed through the disc. The slots and openings permit the flow of the fluid 66 from the chamber 45 to the gap 65. Adjacent the shear surface 64, the slots 70 are chamfered, or beveled, as at 72, so as to produce a wedging action on the fluid in the gap 65 when the disc 61 is moved relative to the housing side wall 52. That is, the wedging action of the beveled surfaces 72 squeezes fluid from the chamber 45 into the gap 65 and tends to maintain a film in the gap under all operating conditions.

From basic considerations of fluid viscosity, it is known that the amount of force or torque transmitted by shear strain between two opposed surfaces, such as the surfaces 60 and 64, is dependent on the thickness of the gap or spacing between the two surfaces. If all other conditions, such as the degree of relative rotation between the two opposed surfaces, remain unchanged, the force or torque transmitted between the surfaces will vary inversely with the thickness of the gap. That is, for a given set of conditions, more force or torque will be transmitted through a thin gap than through a thick gap. In accordance with the present invention, this fact is recognized and used to advantage by providing for the gap 65 to be automatically varied in thickness during the operation of the coupling to control the amount of torque the coupling is capable of transmitting and to give the coupling in general a very desirable torque versus slip characteristic.

To effect variations in the thickness of the gap 65, the coupling includes means for transmitting torque between the drive and driven shafts 14 and 15 through the housing 41 and the loosely mounted disc 61, and for producing axial movement of the intermediate member, or disc, on the shaft 15 which is in proportion to the amount of torque transmitted. As shown best in FIGS. 1, 2 and 5, this means includes three equispaced, cam elements or buttons 74 fixed to the inner radial portion 75 of the disc 61 with their axes parallel to the common axis of the shafts 14 and 15, and three radially extending, equispaced cam elements or pins 76 fixed to the driven shaft 15. The three cam elements 74 are located equal distances from the center of the disc 61 and, as shown in FIG. 5, each includes a stud portion 78 and a head portion 79 having a conical cam surface 80, which is preferably hardened. Each conical cam element is fastened to the disc 61 by its stud 78 which is inserted through the countersunk opening 81 in the disc and riveted or expanded at its end portion.

The radially extending cam pins 76 are press-fitted into openings formed in the shaft 15 and are positioned around the shaft 15 so that the three pins simultaneously engage the conical cam surfaces 80 of the three elements 74. To reduce friction between the conical cam elements 74 and the cam pins 76, each of the pins is preferably provided at its outer end portion with a hardened roller 82 which is free to rotate about the pin and is held thereon by a snap ring 83, the outer portion of the pin being reduced in diameter to provide a journal 84 for the roller.

It will be appreciated that although the conical surfaces 80 of the cam elements 74 and the rollers 82 of the cam pins 76 are hardened to resist wear, these parts of the coupling mechanism undoubtedly will be subjected to the greatest amount of wear, and must be replaced occasionally. This can be accomplished by machining away the riveted or expanded end portions of the studs 78 to permit the worn elements 74 to be removed and new ones to be substituted, and by disconnecting the snap rings 83 from the cam pins 76 to permit the substitution of new rollers 82.

It should be obvious from FIGS. 1 and 2, that the conical cam elements 74 and the radial cam pins 76 cooperate to convert angular movement of the disc 61 relative to the driven shaft 15 into concomitant relative axial movement of the disc on the shaft.

It will be obvious that angular movement of the disc 61 in a counterclockwise direction, as seen in FIG. 2, with respect to the shaft 15 will cause the rollers 82 of the cam pins 76 to ride up on the conical surfaces 80 of the cam elements 74 and produce axial movement of the disc 61 to the left, as viewed in FIG. 1. It should be particularly noted that the three cam elements 74 are located on the same face of the disc as the shear surface 64 so that this axial movement of the disc will increase the thickness of the cap 65 between the opposed surfaces 60 and 64. It also will be noted that the minimum thickness of the gap will exist when the disc 61 is moved angularly in a clockwise direction, as seen in FIG. 2, relative to the shaft 15 a sufficient distance to cause the rollers 82 to ride down the conical surfaces 80 until the rollers engage the face of the disc 61, as seen in FIG. 1.

Axial movement of the disc 61 in the direction which increases the thickness of the gap 65 is resisted by an axially compressible spring assembly 85 encircling the driven shaft 15.

Figure 3:
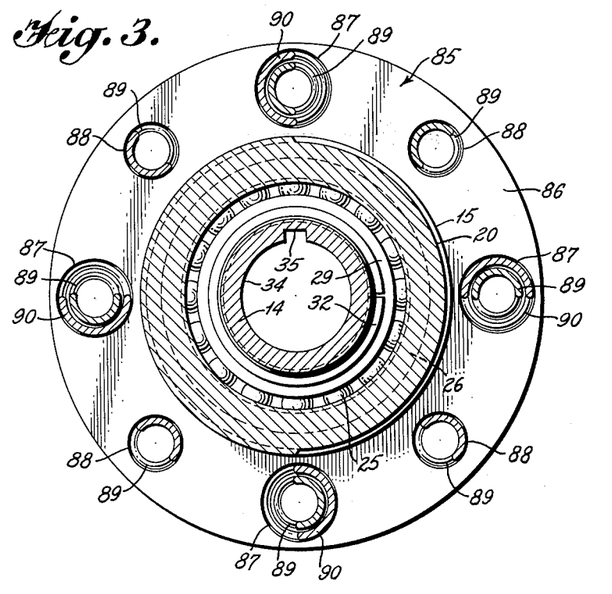
FIGURE 3 is a transverse sectional view taken on line 3—3 of FIG. 1.
Figure 4:
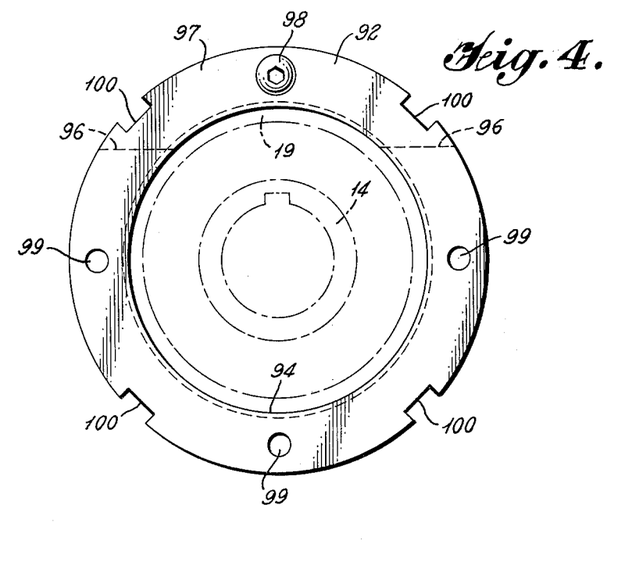
FIGURE 4 is an elevational view of the locking collar employed in the coupling of FIG. 1 for adjusting the initial spring compression.

As shown in FIGS. 1 and 3, the spring assembly 85 includes two axially spaced annular retainers 86 which are loosely mounted on the driven shaft 15. Each of the inner or opposing faces of the discs 86 has four large circular recesses 87 and four smaller circular recesses 88 formed therein at equal angularly spaced positions, as shown in FIG. 3, with the larger recesses 87 being arranged alternately with the smaller recesses 88 around the retainer. As assembled, the larger recesses 87 of the two retainers are in axial alignment and the same relative arrangement also applies to the smaller recesses 88. The opposite end portions of small coil springs 89 are seated in all of the aligned recesses of the two retainers. The end portions of the springs 89 substantially fit the smaller recesses. The aligned larger recesses 87 have the end portions of the larger springs 90 fitted therein. These larger springs encircle the small springs 89 which are associated with the larger recesses.

From FIG. 1, it will be seen that the spring assembly 85 is positioned on the driven shaft 15 to the left of the disc 61 and that the retainer 86 which is adjacent the disc is spaced therefrom by a thrust ring 91. This ring serves to equally distribute the spring force around the inner circumference of the disc and to reduce the friction between the retainer and the disc in the event of relative angular movement between these two parts. The left-hand retainer 86, in FIG. 1, is prevented from moving axially away from the disc 61 by a lock nut 92 that is adjustably mounted on the threaded portion 20 of the driven shaft 15. As illustrated in FIG. 1, the lock nut is slotted circumferentially, or in a plane paralleling its opposite faces, as indicated at 95 in FIG. 1, and the slot extends around the nut slightly more than 90°, or between the broken lines 96—96 of FIG. 4. This slot splits a segment of the nut into two portions 97 which may be drawn toward each other by the screw 98 to provide the locking action of the nut. A spacer or thrust ring 93 is positioned between the retainer 86 and the lock nut 92.

A purpose of the adjustable lock nut 92 is to provide means for varying the normal or minimum force exerted on the disc 61 by the spring assembly 85 which occurs when the disc is positioned to provide the minimum gap thickness, as shown in FIG. 1. This in turn varies the maximum output torque characteristic of the coupling, as will later be evident. The adjustable lock nut 92 also includes several axial holes 99 formed through its body and several grooves 100 formed in its periphery.

From FIG. 1 it will be noted that the opening 57 in the housing is aligned with the body of the adjustable lock nut 92. Therefore, by removing the plug 59, tools may be inserted through the opening 57 to loosen or tighten the bolt 98 and to move the adjustable lock nut on the shaft 15. The latter operation is accomplished by inserting a tool into one of the openings 99 or grooves 100 to hold the ring with respect to the housing. Rotation of the driven shaft 15 will then cause the nut to be moved axially along the thread 20 in one direction or the other depending on the direction in which the shaft is rotated. This in turn will vary the spacing between the spring retainers 86 and change the spring force. Thus, it is evident that the spring force may be readily adjusted without the necessity of disassembling the coupling.

The operation of the structure shown by FIGS. 1 to 6, inclusive, now will be briefly described. Assume that the coupling is in the "at rest" position shown by FIG. 1 with the driving shaft 14 properly connected to a source of power and the driven shaft 15 connected to a load. The driving shaft 14 is then caused to rotate in either direction. This in turn rotates the housing 41 and causes the fluid 66 to be displaced by centrifugal force into the form of an annular ring that occupies the peripheral portion of the chamber 45. This ring of fluid comunicates with the gap 65 through the slots 70 in the disc 61 and, aided by the wedging action of the chamfered edges 72 of the slots, results in a film of fluid being built up and maintained in the gap. Relative movement of the shear surfaces 60 and 64 produces shear strain in the fluid film which results in the development of a viscous force that applies torque to the disc 61.

The torque imparted to the disc 61 by the viscous fluid connection between it and the housing is in turn applied to the driven shaft 15 through the engagement between the conical cam elements 74 and the cam pins 76. This engagement is along a pressure line inclined to the axis of the shaft 15, due to the shape of the conical cam elements, and, therefore, the torque transmitted causes the development of a resultant axial force on the disc acting in a direction which tends to increase the thickness of the gap 65. This resultant force is resisted by the spring assembly 85 and no movement of the disc 61 will occur until the resultant axial force is great enough to overcome the initial spring force applied to the disc. The initial spring force, of course, is dependent on the position of the adjustable lock nut 92 on the shaft 15.

The axially directed resultant force exerted on the disc 61 is directly proportional to the torque transmitted between the disc 61 and the driven shaft 15. Thus, provided the torque does not exceed the value required to produce a resultant force equal to the initial spring force, no movement of the disc will occur and the coupling will behave in general as a conventional fixed gap, viscous fluid coupling. Should, however, the torque transmitted by the coupling exceed the value required to cause movement of the disc 61, the thickness of the gap 65 will be enlarged. This in turn increases the slip of the coupling. Still further increases in the transmitted torque enlarge the thickness of the gap 65 and increase the slip of the coupling. The net result of this action is that after the torque reaches the critical value necessary to cause movement of the disc 61, the output torque of the coupling will thereafter assume a relatively uniform value. One advantage of the coupling is, of course, that this critical value of torque may be readily varied by means of the adjustable lock nut 92.

It should be noted that the minimum thickness of the gap 65 may be made quite small so that when the coupling is operated in the range of no axial disc movement the slip between the disc and the housing will be relatively low. On the other hand, when the disc is moved to increase the thickness of the gap 65, the slip between it and the housing will increase, but despite this increase in slip, the output torque will remain relatively uniform.

Another modification of the invention is shown by

FIGS. 7 to 10, inclusive, and is substantially similar to the above described embodiment except that it includes two intermediate members or shear discs instead of one. Due to the similarity of the two structures, like reference numerals have been applied to like parts of the two modifications, and identical features will not be again described.

Figure 7:
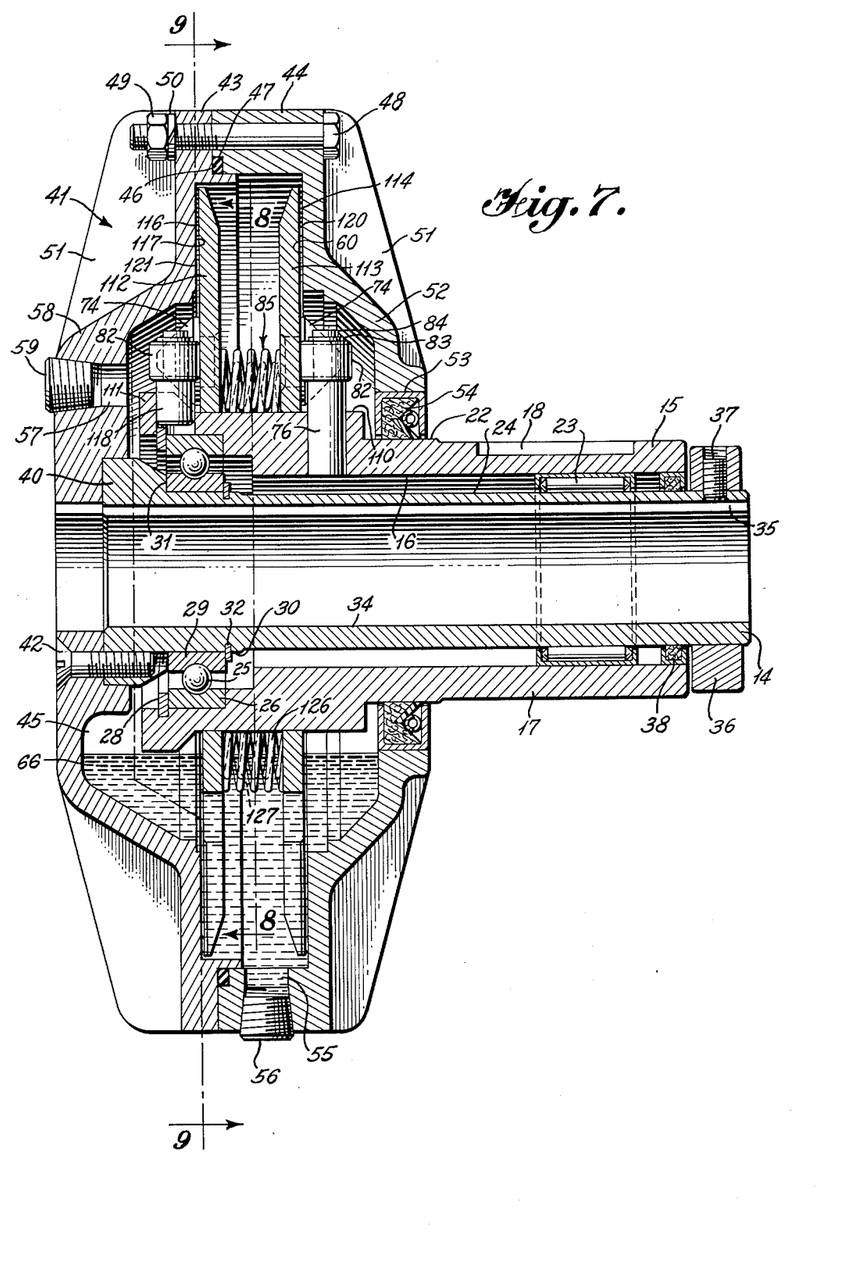
FIGURE 7 is a sectional view of a modified coupling embodying the present invention, with the section being taken on the longitudinal axis of the coupling.
Figure 8:
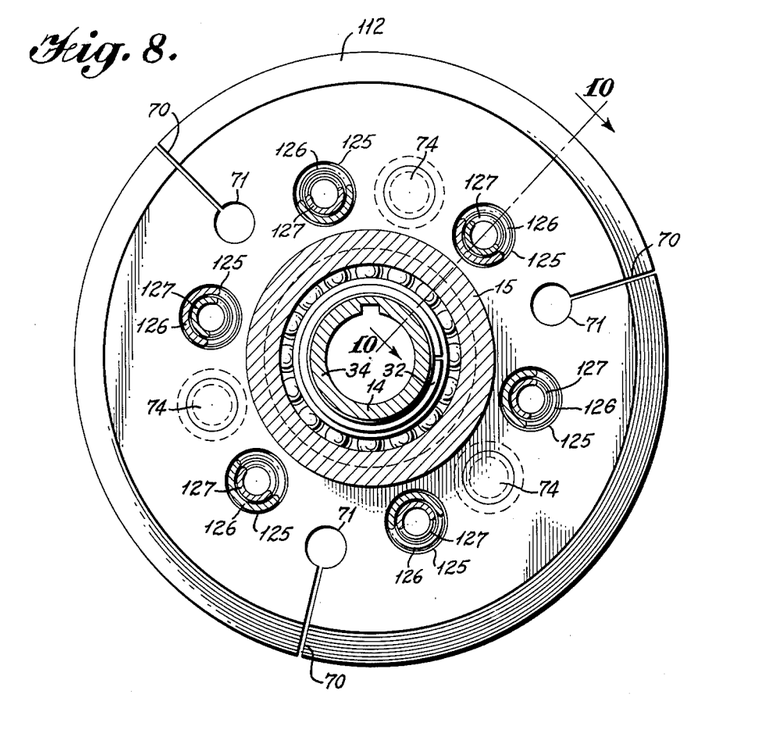
FIGURE 8 is a transverse sectional view taken on line 8—8 of FIG. 7.
Figure 9:
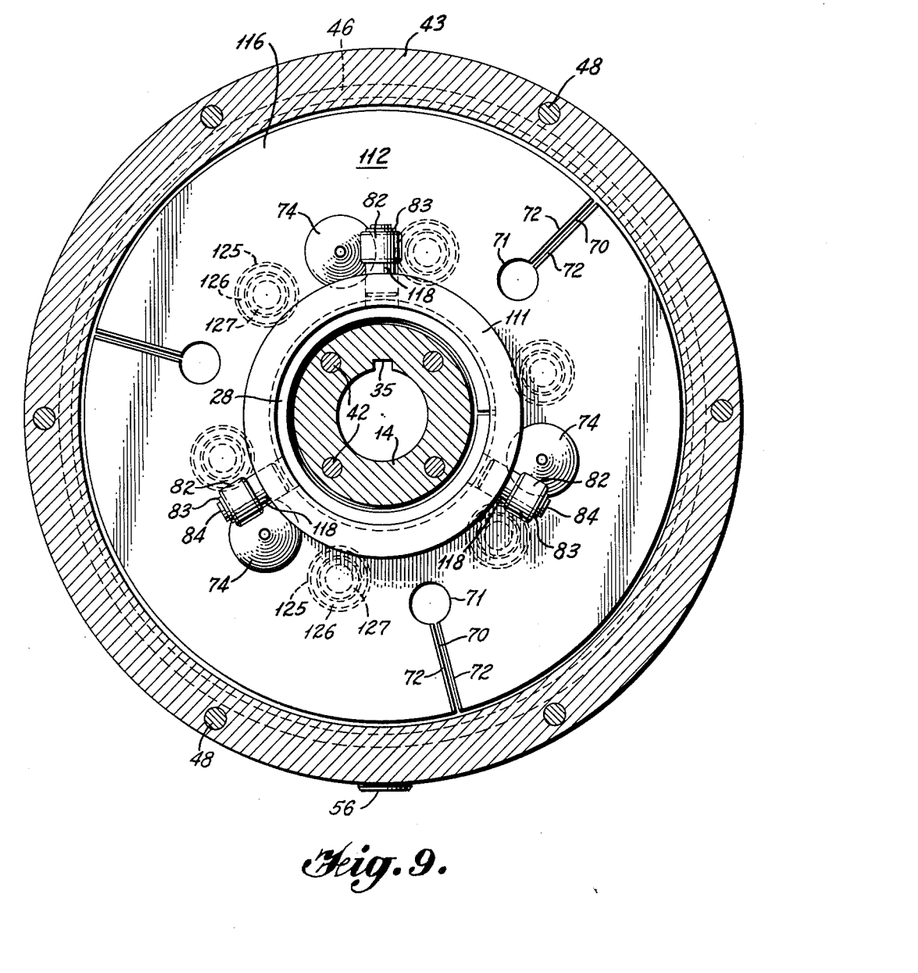
FIGURE 9 is a transverse sectional view taken on line 9—9 of FIG. 7.

Referring first to FIG. 7, it will be noted that the portion of the driven shaft 15 enclosed by the housing 41 is provided with a smooth cylindrical surface 110 of substantial axial length and, at the very end of the shaft, a radially enlarged bead or flange 111. Mounted loosely on the cylindrical surface 110 are two axially spaced, annular intermediate members or discs 112 and 113, respectively. The radially outer portion of the right-hand face of the disc 113 is machined to define an annular shear surface 114 which is normally closely axially spaced from the machined shear surface 60 of the housing section 44 and concentric with the axis of the shafts 14 and 15. The disc 113 is provided with three conically shaped cam elements 74 which engage the rollers 82 of three radially extending cam pins 76 fixed to the shaft 15, the arrangement of the conical cam elements and cam pins being similar to that described in connection with the modification of FIG. 1. The radially outer portion of the left-hand face of the disc 112 is machined to define an annular shear surface 116, concentric with the axis of the shafts 14 and 15, which is normally located in close, axially spaced opposing relationship to another annular shear surface 117 machined on the side wall 58 of the housing section 43. The disc 112 is provided with three conically shaped cam elements 74 on the radially inner portion of its left-hand face which bear against the rollers 82 of the three, relatively short radially extending cam pins 118 press fitted into openings formed in the bead 111 of the shaft 15. Except for their lengths the cam pins 118 are similar to the cam pins 76 as they have reduced diameter journals 84 formed adjacent their outer ends for receiving the rollers 82 with snap rings 83 for retaining the rollers on the journals. The three cam pins 118 are equally, angularly spaced around the shaft 15 as are the conical cam elements 74 on the disc 112, as best shown in FIG. 9.

From FIG. 7 it will be noted that the two shear surfaces 60 and 114 define an annular gap 120, similar to the gap 65 of the FIG. 1 embodiment, for receiving a thin annular film of torque transmitting fluid. When the housing 41 is rotated, the film serves to transmit torque between the housing and the disc 113. Likewise, a similar gap 121 is formed between the shear surfaces 116 and 117 for receiving another fluid film which serves to transmit torque between the housing and the disc 112. It, also, will be obvious that the conical cam elements 74 on the disc 113 together with the cam pins 76 comprise means for moving the disc 113 axially on the shaft 15 in a direction which increases the thickness of the gap 120 as the disc is moved angularly relative to the shaft in the direction which causes the pins 76 to ride up the conical surfaces of the cam elements 74. Similarly, the conical cam elements 74 of the disc 112 together with the cam pins 118 comprise means for moving the disc 112 axially of the shaft 15 in a direction which increases the thickness of the gap 121 as the disc 112 is moved angularly on the shaft 15 in the direction which causes the cam pins 118 to ride up the conical surfaces of the cam elements 74.

Figure 10:
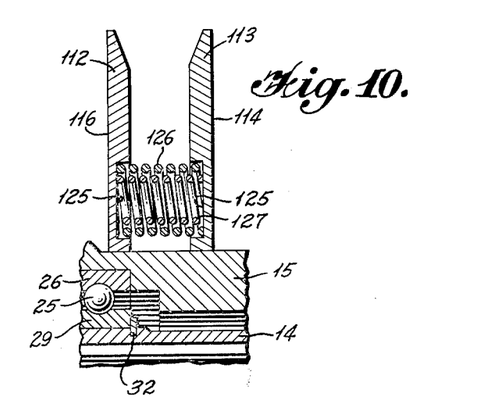
FIGURE 10 is a fragmentary sectional view taken on line 10—10 of FIG. 8.

Axial movement of the discs 112 and 113 in the directions to increase the thickness of the gaps 121 and 120, however, is resisted by the spring assembly 85 which acts equally on both of the discs. In this case, the spring assembly comprises a plurality of coil springs positioned directly between the two discs 112 and 113. As seen best in FIGS. 8 and 10, the opposed or inner faces of the discs 112 and 113 have formed in each of the same six circular recesses 125 which are located at equal angularly spaced positions around a circle concentric with the axis of the shafts 14 and 15. The two discs 112 and 113 are arranged on the shaft 15 with their recesses 125 in axial alignment. Each aligned pair of recesses has the opposite end portions of the two nested coil springs 126 and 127 seated therein, as shown in FIG. 10.

The operation of the coupling shown by FIGS. 7 to 10, inclusive, is substantially similar to that of the coupling shown by FIGS. 1 to 6, inclusive and described above. Rotation of the housing 41 centrifugally displaces the fluid 66 and causes it to take the form of a continuous ring around the peripheral portion of the chamber 45 with the fluid forming a film in each of the gaps 120 and 121. The chamfered edges 72 of the radial slots 70 formed in each of the discs 112 and 113 aid in establishing and maintaining this film.

The film in the gaps 120 and 121 cause the transmission of torque from the housing to the discs 112 and 113 as a consequence of shear strain developed in the fluid film by the relative movement of the opposed surfaces 60—114 and 116—117. The torque transmitted to the disc 112 is applied to the driven shaft 15 through the conical cam elements 74 and the cam pins 118. Due to the camming action of these parts, there also is produced an axially directed force on the disc 112 tending to move it to the right, as viewed in FIG. 7. Likewise, the torque transmitted to the disc 113 is in turn applied to the driven shaft 15 through the conical cam elements 74 on this disc and the cam pins 76. The engagement of the pins with the conical cam elements causes the development of an axially directed resultant force on the disc 113 tending to move it to the left, as viewed in FIG. 7. That is, the resultant forces applied to the discs 112 and 113, respectively, as the result of the transmission of torque to the driven shaft 15, act in opposite directions and tend to move the two discs toward each other so as to compress the springs 126 and 127.

So long as the resultant forces applied to the discs are insufficient to overcome the initial force of the compressed springs, no movement of the discs will occur and the coupling will function as a fixed gap viscous shear device. When, however, the resultant forces do overcome the initial force of the spring assembly, the discs will move toward each other and will increase the thicknesses of the gaps 120 and 121, thereby lowering the maximum torque transmitting capacity of the coupling and providing a relatively uniform output torque at higher rates of slip.

The maximum torque that a coupling, made accordance with either of the modifications of this invention, is capable of transmitting depends, among other things, on the stiffness and precompression of the spring assemblies 85 used to resist axial movement of the disc 61 or the discs 112 and 113. It is, therefore, evident that the critical torque of either of the two modifications may be readily varied by replacing the springs in the spring assembly with springs of other characteristics, such as length and spring constant, or by changing the number of springs in the spring assembly. For example, the smaller springs 89 in the first modification, or the smaller springs 127 in the second modification, could be removed from their respective spring assemblies to alter the performance characteristics of the coupling. Of course, as mentioned above, the critical torque of the first modification may also be varied by shifting the lock nut 92 to change the precompression of the associated spring assembly.

One advantage of the torque-limiting characteristics of both of the above described modifications is that the maximum transmitted torque can be selected to be lower than the maximum torque of the drive motor, thereby guarding the motor against the heavy current drawn when delivering its maximum torque. For example, the maximum torque of a three-phase induction motor is generally somewhere between two and one-quarter to three times its operating torque. Therefore, if the maximum torque of the coupling is set at twice the operating torque of the motor the maximum torque of the motor will never be reached and the motor will always operate within a desirable torque range. Furthermore, under these conditions the motor, when started, will rapidly build up to operating speed, with consequent low starting current, due to the slippage which occurs between the disc or discs and the housing. It is also apparent that the driving shaft may be rotated in either direction and, regardless of the direction, both modifications of the invention will function equally well to transmit and limit torque. For the opposite directions of rotation, the cam pins will engage the conical cam elements on their opposite sides, but the camming action will remain the same.

When used to drive a given mechanical device, either modification of the invention may be designed so that the normal operating torque required by the driven device falls below the critical torque, at which the disc or discs start to move in an axial direction. Under normal operation the disc or discs are therefore each in a position providing minimum film thickness. Operation of the coupling with the disc or discs in this position is advantageous in that changes in fluid viscosity cause only very small changes in slip so that the output speed remains relatively constant over a wide range of fluid conditions.

Assume, for example, that while operating a coupling made in accordance with either of the two disclosed modifications, the torque transmitting fluid is heated so as to lower its viscosity. The slip will increase only slightly. Likewise, if the fluid viscosity is raised by the cooling of the fluid, the slip will decrease only slightly. For example, with a minimal operating slip of between 0.2% and 2.0%, the changes in slip involved are so small as to have little effect on the output speed, which therefore remains relatively constant.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. A power transmission coupling comprising driving, driven and intermediate members supported for relative rotation about a common axis with the intermediate member supported for limited axial movement relative to both other members, said driving and intermediate members having opposed radially extending shear surfaces spaced from and axially movable relative to each other through a limited range of distances to form and at all times maintain a viscous fluid shear connection only between said driving and intermediate members, and means forming a mechanical driving connection between said intermediate and driven members responsive to variations in the force transmitted thereby for effecting limited relative axial movement between said intermediate and said driven and driving members to vary the space between said shear surfaces and to limit the forces transmissible by said viscous fluid shear connection.

2. A power transmission coupling comprising driving, driven and intermediate members suported for relative rotation about a common axis with the intermediate member supported for limited axial movement relative to both other members, said driving and intermediate members having opposed radially extending shear surfaces spaced from and axially movable relative to each other through a limited range of distances to form and at all times maintain a viscous fluid shear connection only between said driving and intermediate members, and means forming a mechanical driving connection between said intermediate and driven members responsive to the force transmitted thereby for effecting limited relative axial and angular movements between said intermediate and driven members, said mechanical connection including cooperating cam elements on said last mentioned members for converting angular movement of said intermediate member relative to said driven member into axial movement of said intermediate member relative to said driven and driving members to vary the space between said shear surfaces and to limit the forces transmissible by said viscous fluid shear connection.

3. A power transmission coupling comprising driving, driven and intermediate members supported for relative rotation about a common axis with the intermediate member supported for limited axial movement relative to both other members, said driving and intermediate members having opposed radially extending shear surfaces variably spaced from each other to form and at all times maintain a variable torque transmitting viscous fluid shear connection between said driving and intermediate members, and means forming a mechanical driving connection between said intermediate and driven members, said mechanical driving connection means including cooperating means on said intermediate and driven members for effecting said limited axial movement of said intermediate member relative to both of said driving and driven members in response to angular movement of the intermediate member relative to the driven member, the limited axial movement of said intermediate member relative to said driving member varying the space between said shear surfaces and the torque transmitting effect of said viscous fluid shear connecting means between a normal and a maximum value.

4. A power transmission coupling as defined in claim 3 further characterized by the cooperating means on the intermediate and driven members comprising cam elements.

5. A power transmission coupling as refined in claim 3 further characterized by means yieldably restraining said axial movement of the intermediate member relative to both of said driving and driven members.

6. A power transmission coupling as defined in claim 3 further characterized by the driven member and the intermediate member being rotatably suported within a housing that forms a part of the driving member, said housing forming a fluid-tight chamber for holding a quantity of viscous torque transmitting fluid, which upon rotation of the driving member with the housing, will be moved by centrifugal force into operative relationship with the said shear connection means.

7. A power transmission coupling comprising driving, driven and intermediate members supported for relative rotation about a common axis with the intermediate member supported for limited axial movement relative to the driving and driven members, said driving and intermediate members having opposed radially extending shear surfaces so spaced from each other as to form and at all times maintain a viscous fluid shear connection only between said driving and intermediate members with the torque transmitting effect of said connection being directly proportional to the slip between said shear surfaces and inversely proportional to the spacing therebetween, means forming a mechanical driving connection between said intermediate and driven members permitting limited relative axial and angular movements between said members, and means operating independently of the speed of rotation of said members and responsive to variations in the torque transmitted between the intermediate and driven members for effecting axial and angular movements of the intermediate member relative to the driven and driving members to limit to a preselected maximum value the torque transmissible by said viscous fluid shear connection.

8. A power transmission coupling as defined in claim 7 further characterized by means for retaining said driving and driven members in fixed axial relationship with each other while the intermediate member is moved axially relative to said driving and driven members.

9. A power transmission coupling comprising driving, driven and intermediate members supported for relative rotation about a common axis with the intermediate member supported for limited axial movement relative to both other members, said driving and intermediate members having opposed radially extending shear surfaces spaced a given distance from each other when said intermediate member is in its normal axial position to form a viscous fluid shear connection only between said driving and intermediate members, said intermediate member being supported by the driven member, means yieldably holding said intermediate member in said normal axial position with respect to said driving member, and driving means for transmitting torque between said intermediate member and said driven member and, in response to an increase in the torque transmitted by the driving means, for exerting an axially directed resultant force on said intermediate member to move the same through a limited distance axially against the force of said yieldable means and out of said given position and to increase the space between said shear surfaces while maintaining said torque transmitting relationship between the driving and intermediate members.

10. A power transmission coupling as defined in claim 9 further characterized by said driving means comprising engaging cam elements on said intermediate and driven members with said cam surfaces being shaped and arranged to effect axial movement of said intermediate member relative to said driven member.

11. A power transmission coupling as defined in claim 9 further characterized by said driving means comprising a plurality of circumferentially spaced cam elements extending axially from said intermediate member and an equal number of similiarly spaced cam elements extending radially from the driven member and cooperating with the cam elements carried by the intermediate member.

12. A power transmission coupling as defined in claim 11 further characterized by said yieldable means comprising a spring assembly bearing axially against the intermediate member to exert a force in opposition to the action of the cooperating cam elements.

13. A power transmission coupling comprising a rotatable housing forming a fluid-tight chamber for holding a quantity of viscous torque transmitting fluid, means defining a radially extending shear driving surface on one wall of said chamber, a driving shaft connected to said housing, a driven member located in said chamber and journaled in said housing, an intermediate member carried by said driven member and having a radially extending viscous fluid shear driven surface disposed in closely spaced cooperative relation to said driving surface of the housing with the space between said cooperating surfaces being in communication with the viscous fluid holding housing chamber, means supporting said intermediate member on said driven member for limited axial movement of its shear surface relative to the shear surface on the housing to maintain a variable gap between the cooperating shear surfaces and thereby maintain within predetermined limits the torque transmitting effect of said surfaces and the viscous fluid therebetween, and means for transmitting torque between said intermediate and driven members and, when the torque transmitted therebetween reaches a predetermined value, for moving said intermediate member axially to increase the gap between said shear surfaces while maintaining said torque transmitting effect.

14. A power transmission coupling as defined in claim 13 further characterized by the means for transmitting torque between the intermediate and driven members and for moving the intermediate member axially comprising a cam action mechanical driving connection between the intermediate and driven members.

15. A power transmission coupling as defined in claim 13 further characterized by the quantity of said viscous fluid in the housing chamber being only sufficient to partially fill said chamber, and the said radially extending viscous fluid shear driving and driven surfaces being so positioned relative to the peripheral surface of the fluid-tight housing chamber that rotation of the housing will throw the viscous fluid by centrifugal force into the space between said driving and driven surfaces to develop a viscous fluid shear film between said surfaces.

16. A power transmission coupling comprising a driving, a driven and two intermediate members supported for relative rotation about a common axis with the two intermediate members supported on the driven member for limited axial and angular movements relative to the driven member, said driving member having two opposed, radially extending shear surfaces, said two intermediate members being positioned between the two opposed shear surfaces of the driving member and having oppositely outwardly facing, radially extending shear surfaces spaced from and movable for limited axial distances relative to the two shear surfaces of the driving member to form and at all times maintain viscous fluid shear connections only between the driving member and the two intermediate members, and means forming a separate mechanical driving connection between the driven member and each one of the two intermediate members, said mechanical driving connection means being responsive to variations in the torque transmitted thereby for effecting said limited relative axial and angular movements between the intermediate members and the driven member to vary the spacing between the opposed shear surfaces while maintaining such viscous fluid shear connections.

17. A power transmission coupling as defined in claim 16 further characterized by each of said mechanical driving connection means comprising cooperating cam elements mounted on one of the intermediate members and the driven member.

18. A power transmission coupling as defined in claim 16 further characterized by resilient means positioned between the two intermediate members for yieldably urging said members axially toward the two opposed shear surfaces of the driving member.

19. A power transmission coupling as defined in claim 16 further characterized by said driving member including a housing forming a fluid-tight chamber for holding a quantity of viscous torque transmitting fluid, and the said two opposed, radially extending shear surfaces being formed on parallel side walls of said housing.

20. A power transmission coupling comprising a rotatable driving member having a radially extending shear surface, a driven member supported by the driving member for rotation relative thereto, an intermediate member supported on the driven member for both limited axial and angular movements relative thereto and having a radially extending shear surface variably spaced from the shear surface of the driving member to form and at all times maintain a viscous fluid shear connection only between the driving and intermediate members, means forming a mechanical driving connection between the driving member and the intermediate member, said mechanical driving connection determining the minimum thickness of the space between the two radially extending shear surfaces and being responsive to the torque transmitted thereby for effecting axial movement of the intermediate member to increase to a limited degree the thickness of said space and to thereby limit the torque transmitting effect of said viscous fluid shear connection in response to angular movement of the intermediate member relative to the driven member, a spring assembly supported on the driven member and yieldably resisting axial movement of the intermediate member in the direction which will increase the thickness of said space, and means adjustably mounted on the driven member for maintaining the spring assembly under compression and for varying the degree of the minimum compression of said spring assembly.

(References on following page)

References Cited in the file of this patent

UNITED STATES PATENTS

| | | |
|---|---|---|
| 1,118,683 | Rindfleisch | Nov. 24, 1914 |
| 2,046,723 | Brownscombe | July 7, 1936 |
| 2,079,724 | Van Ranst | May 11, 1937 |
| 2,313,132 | Elliott | Mar. 9, 1943 |
| 2,587,712 | Dodge | Mar. 4, 1952 |
| 2,684,743 | Trofimov | July 27, 1954 |
| 2,838,244 | Oldberg | June 10, 1958 |
| 2,879,755 | Weir | Mar. 31, 1959 |

FOREIGN PATENTS

| | | |
|---|---|---|
| 295,373 | Great Britain | June 18, 1928 |
| 766,948 | Great Britain | Jan. 30, 1957 |